(12) United States Patent
Moulsley

(10) Patent No.: US 6,898,417 B1
(45) Date of Patent: May 24, 2005

(54) METHOD FOR THE COMMUNICATION OF INFORMATION AND APPARATUS EMPLOYING THE METHOD

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/400,764

(22) Filed: Sep. 21, 1999

(30) Foreign Application Priority Data

Sep. 30, 1998 (GB) .............................. 9821089

(51) Int. Cl.$^7$ .............................. H04B 1/00; H04B 7/00
(52) U.S. Cl. .......................... 455/69; 455/522; 455/88
(58) Field of Search ............................. 455/68–69, 88, 455/226.1–3, 522, 67.11, 177.5, 229.1, 229.2, 229.3; 370/311; 714/746, 748, 751–752

(56) References Cited

U.S. PATENT DOCUMENTS

| | | | | |
|---|---|---|---|---|
| 4,584,685 | A | | 4/1986 | Gajjar ........................ 371/35 |
| 4,697,281 | A | | 9/1987 | O'Sullivan .................. 379/59 |
| 4,939,731 | A | | 7/1990 | Reed et al. .................. 371/32 |
| 5,105,423 | A | | 4/1992 | Tanaka et al. ............... 371/5.5 |
| 5,128,965 | A | | 7/1992 | Henriksson ................. 375/58 |
| 5,266,922 | A | * | 11/1993 | Smith et al. ................ 340/525 |
| 5,396,649 | A | * | 3/1995 | Hamabe ..................... 455/513 |
| 5,461,639 | A | | 10/1995 | Wheatley, III et al. ..... 375/205 |
| 5,465,398 | A | * | 11/1995 | Flammer .................... 455/69 |
| 5,526,399 | A | | 6/1996 | Kameda ...................... 371/58 |
| 5,563,895 | A | | 10/1996 | Malkamaki et al. ........ 371/32 |
| 5,699,367 | A | | 12/1997 | Haartsen ..................... 371/33 |
| 5,713,074 | A | * | 1/1998 | Hulbert ....................... 455/69 |
| 5,722,051 | A | * | 2/1998 | Agrawal et al. ............. 455/69 |
| 5,729,557 | A | | 3/1998 | Gardner et al. ............. 371/41 |
| 6,069,901 | A | * | 5/2000 | Hulyalkar et al. .......... 370/509 |
| 6,259,928 | B1 | * | 7/2001 | Vembu ........................ 455/522 |
| 6,272,354 | B1 | * | 8/2001 | Saario ........................ 455/522 |
| 6,285,886 | B1 | * | 9/2001 | Kamel et al. ............... 455/522 |
| 6,519,236 | B1 | * | 2/2003 | Haartsen et al. ............ 370/332 |

FOREIGN PATENT DOCUMENTS

| WO | WO9718650 | 5/1997 | ............. H04L/1/08 |
|---|---|---|---|
| WO | WO9724820 | 7/1997 | ............. H04B/7/26 |

OTHER PUBLICATIONS

By Zorzi, M. & Rao, R.R., (ABST.) IEEE Personal Communications (USA) vol. 4 No. 6 P. 1–2 Dec. 1997.
By Shimamoto, S., Onozato, Y.& TE–Shigawara, Y.(ABST) Translations of the Institute of Electronics Information and Communication Engineers B I (Japan vol. J 75 B I No. 12. pp. 1–2, Dec. 1992).
By Fred Halsall "Data Communications, Computer Networks and OSI" (Second Edition) 123–131, Published by the Addison–Wesley Publishing Company 1988.

* cited by examiner

*Primary Examiner*—Vivian Chin
*Assistant Examiner*—Tuan Tran
(74) *Attorney, Agent, or Firm*—Dicran Halajian

(57) ABSTRACT

A method and apparatus for transferring information over a communications link includes transmitting information at a first power level, monitoring for correct reception of the transmitted information and transmitting further information at a second-, greater power level than that used for the original transmission if correct reception did not occur. The further information allows the content of the originally transmitted information to be established and in one embodiment constitutes a retransmission of the originally transmitted information. By retransmitting at a greater power level the probability of correct reception is enhanced, especially when the communications link is wireless. A transmitter employing the present invention may offer reduced power consumption since the transmission power level used for the original transmission may be lower than that used by a transmitter not benefiting from the present invention.

28 Claims, 2 Drawing Sheets

METHOD FOR THE COMMUNICATION OF INFORMATION AND APPARATUS EMPLOYING THE METHOD

FIELD OF THE INVENTION

The present invention relates to digital communication systems and more particularly to the exchange of information over wireless digital communication links of varying quality. In comparison to links which are wired, a greater variation in quality is usually observed in wireless links, for example the radio links found in a cellular mobile radio telephone system between mobile telephones and basestations.

BACKGROUND OF THE INVENTION

Communication systems, including cellular mobile telephone systems and networks are making increasing use of digital technology. Cellular mobile telephone networks require a wireless radio communication link to be established between a mobile terminal and a basestation. Second generation cellular mobile telephone systems exchange digital signals over the wireless radio communications link.

Digital systems can be exploited to provide greater spectral efficiency of a radio communications link than is offered by an analogue system and digital processing can often minimise the effects of interference.

In communication systems that rely on wireless links, such as mobile communications systems, the quality of these links can vary considerably. A number of factors influence the quality of the link and the system must be tolerant of any such variation. In systems employing an analogue link, a reduction in link quality may merely result in a noisy but tolerable link being established. However, in systems employing a digital link, it is important that the information sent over the link can be faithfully recovered at the receiving end, even when the link quality is poor. The effect of incorrectly received information depends on the application. For example, in the case of a digital cellular mobile radio telephone system employing a wireless radio link, during a telephone conversation, incorrect reception and loss of information over the link may just result in a temporary muting of sound. However, with the advent of mobile computing, mobile telephone cellular networks are increasingly used for the communication of data and in this situation any loss of data is unacceptable.

Various techniques are known for assisting with correct communication of digital information over a range of media and some of these techniques fall into the category of error detection and correction. One technique is forward error correction (FEC) which involves encoding information prior to transmission in such a way that any errors occurring during communication may be identified and corrected on reception. Another technique is to employ an automatic repeat request (ARQ) error control scheme which involves the retransmission of information that is deemed to have been erroneously received or not received at all. There are various derivatives of the basic ARQ scheme and these are employed depending on the feasibility of providing buffer space at the transmit/receive ends of the link and the requirement to utilise the link efficiently. Indeed some ARQ schemes do not merely retransmit the same information. In the case of these schemes retransmission involves the (re)transmission of only a portion of the information, transmission of appropriate FEC information or any combination thereof. Various ARQ schemes are well known to the person skilled in the art, as is the fact that retransmission may be initiated in the absence of an acknowledgement that information has been received correctly or even incorrectly. This is in contrast to the situation where an explicit request for retransmission is sent to the transmitter. When FEC and ARQ techniques are combined they can provide a powerful error detection and correction mechanism and in certain implementations ARQ operation only becomes active if FEC fails to recover information. However both techniques are most effective when the quality of the link is more predictable and consistent as may be provided, for example, by a co-axial cable although wired twisted pair links are susceptible to noise. In contrast, with wireless radio communication links, such as those employed between mobile cellular telephones and basestations, the link quality is constantly changing due to the movement should the terminal be mobile, obstructions caused by buildings, the geography of the area, weather conditions and the distance of the wireless link. In particularly poor conditions ARQ techniques will result in multiple retransmissions occurring which may cause a delay in data communication and an overall increase in system power consumption. Where components of the system, for example mobile terminals, rely on battery power this is particularly undesirable.

Where the radio link quality deteriorates because of large signal fluctuations, for example at the onset of a deep fade, various prior art remedies have been proposed.

U.S. Pat. No. 5,105,423 describes a method of shifting down a data transmission rate in response to a request from a receiver for retransmission of data frames having errors in them. The data transmission rate is shifted down from a first data rate to a second data rate which is used for retransmission. The shift down rate is calculated based on the possibility of errors re-occurring during retransmission, which is in turn calculated on the basis of the percentage of frames that need to be re-transmitted. The reduction in transmission rate is undesirable in certain applications especially those where rapid data transmission is a priority.

U.S. Pat. No. 5,128,965 describes a radio link system where overall transmission power is increased should the receiver indicate that the number of errors in the received information exceeds a particular threshold. A system described in U.S. Pat. No. 5,713,074 employs power controller apparatus to increase transmit power when an error is detected in a transmitted signal, and to reduce the transmit power by a smaller amount when no error is detected, thus maintaining a constant bit error rate. Error detection is facilitated by returning the received signal to the transmitter and comparing the received signal to that transmitted.

The standard TIA/EIA-95-B published on $3^{rd}$ Feb. 1999 by the Telecommunications Industry Association is developed from interim standard TIA/EIA/IS-95 which describes the process where a mobile terminal signals a fixed system over the air interface for the purpose of gaining access. If the mobile terminal does not receive a reply from the fixed system, the mobile terminal repeats the signalling process but with an increased transmission power. This signalling process is concerned only with the task of obtaining access and not with the transfer of traffic.

SUMMARY OF THE INVENTION

In accordance with a first aspect of the present invention there is provided a method of transferring traffic information in units over a wireless digital communications link between a transmitting station and a receiving station comprising the steps of transmitting first information units at a first power level; monitoring if correct reception of the transmitted units occurred; and transmitting second information units associated with the first information units, for which first information units the monitoring did not indicate correct reception occurred, at a second power level, which is greater than the first power level, the second information units allowing the content of the first information units to be established.

In one preferred scheme in accordance with the above aspect, the content of the second information units is the same as the content of the first information units. In this case transmission of the second information units constitutes a retransmission of the first information units. In a second preferred scheme in accordance with the above aspect the content of the second information units comprises a portion of the content of the first transmission units. In this case transmission of the second information units constitutes a partial retransmission of the first information units. In a third scheme in accordance with the above aspect the second information units include error correction information and in particular forward error correction information, associated with the first information units. In a fourth scheme in accordance with the above aspect the second information units include enhanced error correction information and in particular enhanced forward error correction information, associated with the first information units. One or more of the above schemes may be combined as will be appreciated and understood by the person skilled in the art.

By transmitting the second information units at a greater power level the probability of successful transfer of information is greatly enhanced in situations where failure of the original transmission of first information units occurred, in particular if this is due to a low received signal level. While this is a robust transfer method, another advantage attributed to the increased likelihood of successful transmission of second information units is a reduction in the probability of long transmission delays that can result through the occurrence of multiple transmissions of second information units. This is of particular benefit where there is a maximum allowable transmission delay, for example in real-time or substantially real-ime systems.

Typically, monitoring is performed by the transmitting station based on information provided by the receiving station. The information provided by the receiving station will vary depending on the implementation of the method, although examples of the information provided include identification of correct transfer of units or of incorrect (corrupted) transfer of units or both. The monitoring performed by the transmitting station could also include circumstances where no monitoring information is received from the receiving station for given first information units, which is interpreted as indicating that correct reception of the first information units did not occur.

The method may be used in conjunction with forward error correction (FEC) techniques as mentioned above. In this case there may be no need to transmit associated second information units for first information units that have been incorrectly received (corrupted) if the content of the transmitted first information units can be recovered by FEC techniques at the receiving station. Preferably the monitoring step suitably accommodates for this eventuality, for example through the receiving station not providing information that would initiate a transmission of second information units.

Preferably the first power level is selected to be the lowest level which corresponds to a maximum allowable probability of failed transmission and consequent transmission of associated second information units.

In accordance with a second aspect of the present invention there is provided a digital wireless communications system comprising at least one transmitter having means for transmitting first information units at a first power level; at least one receiver having means for receiving the transmitted information units; control means for controlling the transmitter output power; and monitoring means for monitoring if correct reception of the transmitted units occurred at the receiver, wherein the transmitting means transmits second information units associated with the first information units for which first information units the monitoring means does not indicate correct reception has occurred, the second information units being transmitted at a second power level that is greater than the first power level, the second power level being selected by the control means and wherein the second information units allow the content of the first information units to be established. In this case the control means could be made responsive to the monitoring means.

In accordance with a third aspect of the present invention there is provided a transmitter station for digital wireless transmission of traffic information to a receiver, said transmitter station having a transmitter for transmitting first information units at a first power level; control means for controlling the transmitter output power; and monitoring means for monitoring if correct reception of the transmitted units occurred at the receiver, wherein the transmitter transmits second information units associated with the first information units for which first information units the monitoring means does not indicate correct reception has occurred, the second information units being transmitted at a second power level that is greater than the first power level, the second power level being selected by the control means and wherein the second information units allow the content of the first information units to be established. In this case the control means could be made responsive to the monitoring means.

Preferably the control means of the system or transmitting station selects the first power level to control the average power consumption of the transmitter in order to maintain a minimum average power consumption taking into account the first power level and the second power level for the consequent probability of transmission of second information units. This is particularly beneficial where power is provided by an exhaustible power source such as a battery. Alternatively the first power level may be set to maintain a minimum average power consumption for an allowable maximum probability of transmission of second information units occurring.

BRIEF DESCRIPTION OF THE DRAWINGS

The invention will now be described by way of example with reference to the accompanying drawings.

DETAILED DESCRIPTION OF THE INVENTION

Figure 1:
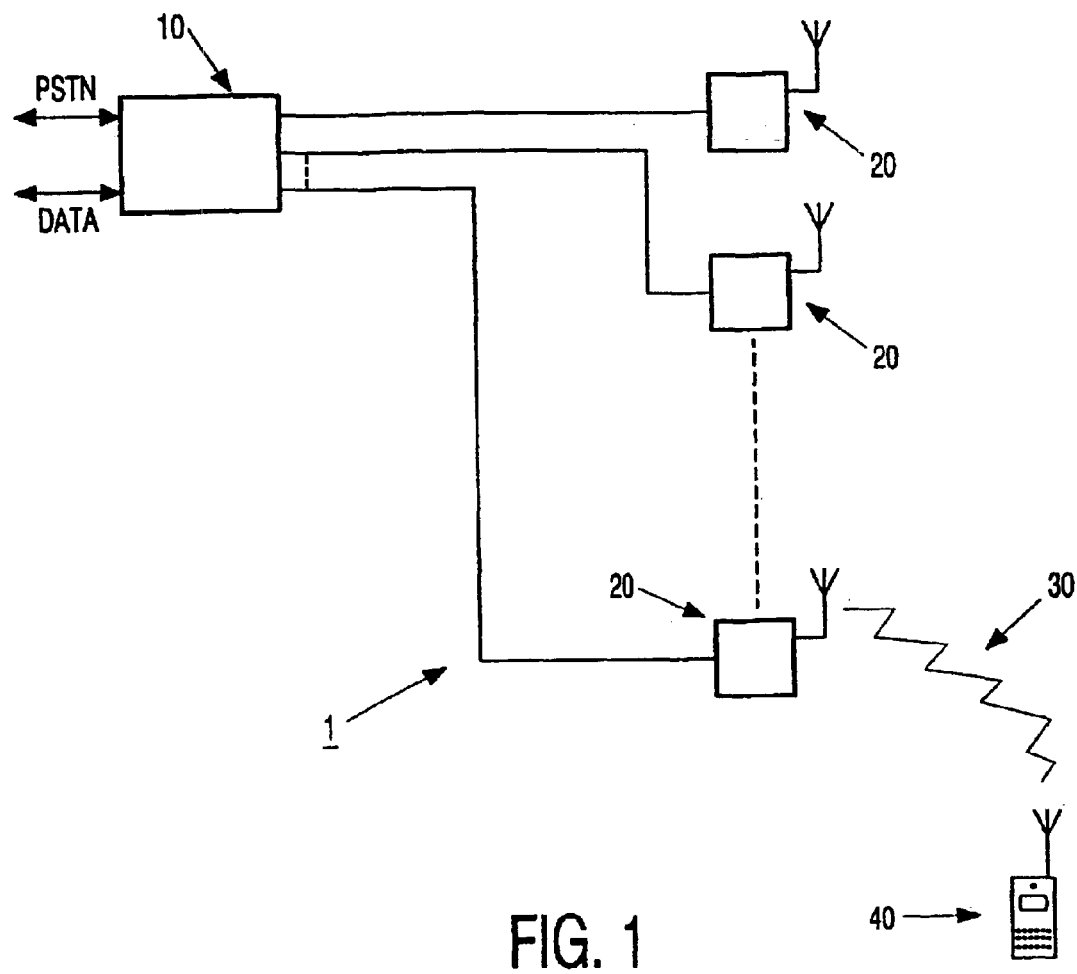
FIG. 1 is a schematic representation of a typical cellular mobile radio telephone communications system employing at least one wireless radio communications link.

Referring to FIG. 1, a communications system 1 in the form of a cellular mobile radio telephone system includes a switching centre 10, which is connected to the public switched telephone network (PSTN) and to other data networks if required. The switching centre is typically one of a number of switching centres and a number of basestations 20 are connected to each switching centre. The main function of the basestations 20 is to establish a radio link 30 with a terminal 40, such as a mobile telephone and therefore allow communication between the mobile terminal 40 and the rest of the system. Although the system employs a radio link, the present invention relates also to transmitting information over other types of links that do not necessarily operate in the radio frequency part of the electromagnetic spectrum, and such references to "radio" links are made by way of example only. Each basestation 20 is usually capable of supporting a plurality of such links 30 and therefore a plurality of mobile terminals 40. The basestation 20 and the terminals 40 are each provided with radio transmitting and receiving means for establishing the links 30. It is assumed that the radio link 30 is digital and furthermore may employ techniques such as Time Division Multiple Access (TDMA) or Code Division Multiple Access (CDMA).

In use, the quality of a link 30 established between the basestation 20 and the terminal 40 will vary considerably and the system must be tolerant of fluctuating link quality. Where digital information is being exchanged, as in the present example, this may result in the incorrect reception of digital information. Error correction techniques such as forward error correction (FEC) may be employed which can allow recovery of the correct information from the incorrectly received information. As the quality of the link 30 deteriorates further FEC techniques may not be adequate to recover the correct information and in this case there is no alternative but to initiate further transmission for any incorrectly received information. These further transmissions may take a variety of forms although one practice is to employ ARQ schemes as mentioned earlier. In each case, regardless of the scheme chosen the further transmissions may be considered as the transmission of second information units that are associated in some way to (failed) previously transmitted first information units. As also mentioned above the further transmissions (of second information units) can involve a straightforward retransmission of information, (re)transmission of only a portion of the information, transmission of appropriate FEC information, transmission of enhanced FEC information or any reasonable combination thereof. However, for the purpose of illustrating the present invention, and by way of example only, the following specific description relates to a typical ARQ scheme where the transmission of second information units actually constitutes a repeat transmission of (failed) first transmission units.

Figure 3:
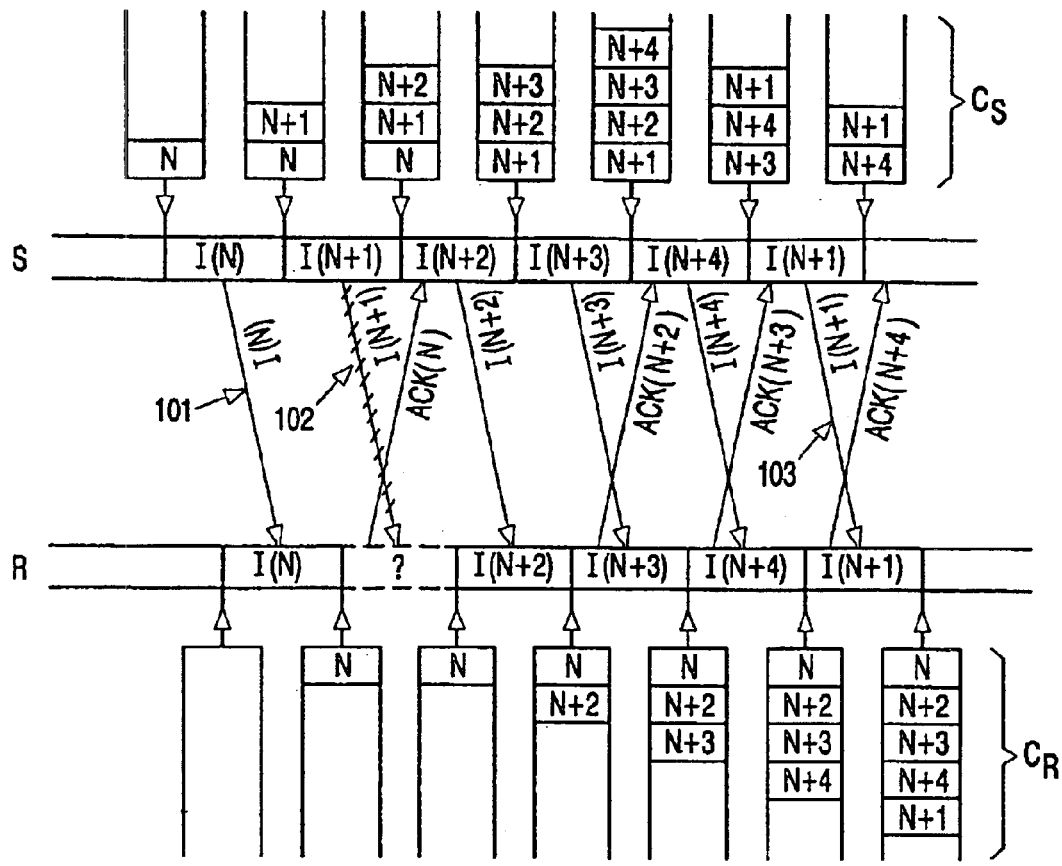
FIG. 3 illustrates the operation of a typical known automatic repeat request (ARQ) error control scheme.

The retransmission of information occurs without the intervention of a user and is therefore called an automatic repeat request (ARQ). By way of example only, a typical ARQ scheme may be understood by reference to FIG. 3 which shows the frame sequence of a so called selective RQ scheme ARQ implementation (where a frame is a unit of information transferred across the data link 30 of this example). This known scheme is discussed in more detail in the publication "Data Communications, Computer Networks and OSI" (second edition) at page 126–127 by Fred Halsall and published by the Addison-Wesley Publishing Company. Although information often flows in both directions across a link, FIG. 3 shows a situation where information is being sent from a sender (S) to a receiver (R) in the form of a number N of information frames I. Each transmitted frame contains a unique identifier which allows the sender S and the receiver R to keep track of individual frames. Both the sender and the receiver are provided with buffer storage space $C_S$ and $C_R$ respectively to record the frames that have been sent or received. When, for example, the frame I (N) denoted as 101 is transmitted by the sender S, this is recorded in the buffer $C_S$. Frames are sent continuously and the contents of $C_S$ form a (provisional) retransmission list. The receiver R returns an acknowledgement ACK to S for each correctly received frame and also records a list of correctly received frames in the buffer $C_R$. When the sender S receives acknowledgement ACK from the receiver R that a particular frame has been received correctly, sender S removes from the buffer $C_S$ the entry that corresponds to that acknowledged frame. Each I frame is coded to permit the receiver R to establish that the I frame is not corrupted. Various ways of doing this include the use of cyclic redundancy check (CRC) error checking. Now with further reference to FIG. 3, it is assumed that frame I (N+1) which is denoted as 102 becomes corrupted during transmission which is shown as a crossed line. This results in the absence of an acknowledgement for the I frame N+1 while acknowledgement ACK of the other illustrated frames N, N+2, N+3 . . . occurs normally. The sender S detects frame N+1 has not been acknowledged causing sender S to retransmit the frame as is denoted at 103. Depending upon the particular implementation of the ARQ scheme, subsequent retransmission may occur until correct receipt of a frame is acknowledged.

Where multiple retransmissions occur this can cause problems in certain systems. Firstly, multiple retransmissions may cause a significant delay. A second problem occurs in systems where large messages are transferred which are required to be broken into a number of frames. Because the frames must be reassembled in the correct order before the message can be recovered, this can require the use of large buffer storage space for temporary storage of frames received out of sequence. This is illustrated in the above example where frame (N+1) is retransmitted after transmission of frame (N+4). In order to recover the original message it is necessary for the receiver R to buffer the frames N+2, N+3 and N+4 which have been received out of sequence. Alternatively, or in addition to this buffering, the transmitter may buffer frames ready for retransmission.

Figure 4:
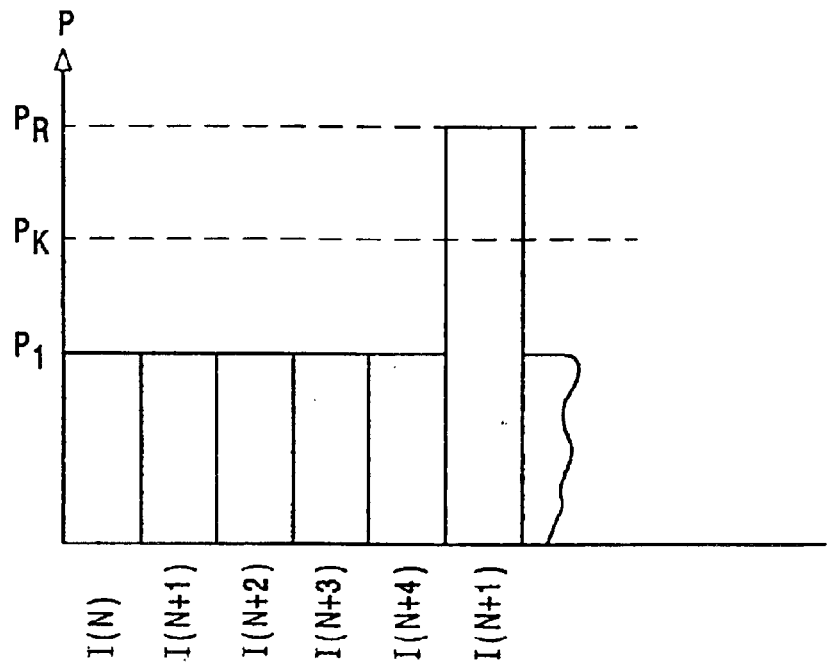
FIG. 4 illustrates the operation of an implementation of an error control scheme in accordance with the present invention.

In data communication systems employing a physical link, such as a coaxial cable, incorrect transfer of information is frequently caused by spurious noise or collision of data, in which case simple retransmission of data is likely to be successful on the first attempt. However, in the case of a wireless communication link, such as that employed between a mobile terminal 40 and a basestation 20, incorrect transmission of information is often caused by a weak signal reaching the receiving end of the link. Furthermore this signal strength may be constantly varying due to a changing operating environment and in these situations a simple retransmission of incorrectly received information may be unsatisfactory. In this case and in accordance with the present invention, information that needs to be retransmitted is sent over the link 30 with a transmission power that is greater than the transmission power used to transmit that information originally. This is illustrated in FIG. 4, which shows the same frame transmission sequence of FIG. 3 along the x-axis and transmission power on the y-axis. Frames are normally transmitted at power $P_1$ whereas retransmitted frames are transmitted at power $P_R$. This increases the probability of repeated information being successfully received on retransmission, especially under conditions where signal strength is weak or fading occurs.

Furthermore the increased likelihood of successful communication resulting on the first retransmission allows a smaller buffer space to be employed in the transmitter and/or receiver for storing frames or a list of frames. The increased likelihood of successful communication resulting on the first retransmission can also result in reduced delay when sending the information, which is advantageous when carrying real time information such as video or audio. Benefits may also result when transmitting other types of information for which a transmission delay beyond a predetermined period is unacceptable. The power amplitude of the retransmitted frames (second information units) may, for example, be in the order of 3 dB higher than the power amplitude used for the initial transmission of the frames (first information units) although other amplitudes may be chosen to give different relative powers and the above value is not intended to limit the scope of the present invention.

Figure 2:
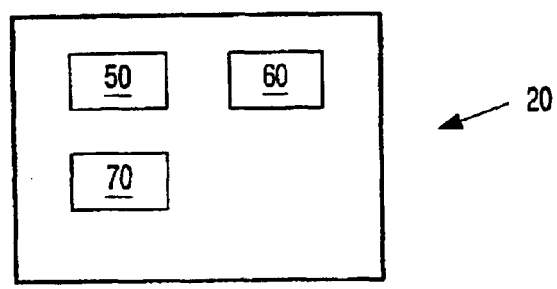
FIG. 2 is a schematic representation of components in a transmitter stage from the system of FIG. 1.

FIG. 2 shows components of the transmitter stage in a basestation 20 of the telecommunications system 1. A transmitter 50 transmits units of information as frames with a power that is governed by control means 60. In this example control means 60 is responsive to monitoring means 70. As stated above the transmitter 50 will output retransmitted information with a greater transmission power than the transmission power used to transmit that information originally. Although the transmitter 50, control means 60 and monitoring means 70 are shown together as components of the transmitter stage in the base station 20, this does not indicate a limitation of the present invention. For example the monitoring means may be located away from the transmitter stage. In some cases the monitoring means may be located at the receiving end of the wireless link.

The above scheme allows retransmitted data to be successfully communicated with an increased level of confidence and this may be exploited in those applications where it is preferable that information should be successfully communicated by the first retransmission attempt. The transmsission power levels for the first transmission attempt may be variable in a method and a system operating according to the invention. For example it may be desirable to select this initial transmission power level $P_1$ such that a particular proportion of initial transmissions are likely to require retransmission (at the higher power level). Selection of the transmission power levels for the first transmission attempt will influence the proportion of retransmissions and thereby influence the average transmission power level. Lowering the initial transmission power will reduce the probability of information being successfully received. However, by using a low transmission power the power consumption of the transmitter will be reduced. The transmission power for the first attempt may in this way be used to control the average power consumption (which of course must take into account the transmissions at the higher power) of the transmitting circuitry, and preferably maintain a minimum average power consumption. Obviously, certain applications will be more tolerant than others to the occurrence of retransmissions and a balance needs to be established based on the relative importance of power saving versus the occurrence of retransmission. Indeed, excessive retransmission may give rise to a greater average power consumption than would occur if choosing to initially transmit at a higher power level thus reducing the number of retransmissions. The present invention is primarily intended for use in the transmission of traffic, which may for example be user video, voice, or file data and the requirements for transmitting various types of traffic will be known to one skilled in the art. An overall reduction in transmission power reduces power consumption. This is of particular benefit when an exhaustible power source, such as a battery is being used. In certain implementations it may be desirable to impose a limitation on the number of retransmissions that are permitted in the interest of power saving and/or limiting transmission delay.

This power saving feature is also illustrated in FIG. 4. Information is initially transmitted at power $P_1$ which is below the power $P_k$ that would be used for transmission and retransmission in a system not benefiting from the invention. As will be noted, the re-transmitted information, in this case I frame (N+1), is re-transmitted at power $P_R$ which is greater than $P_1$. In this case, $P_R$ is also greater than $P_K$ although this is not mandatory. The reduction in overall power consumption may be exploited to provide a number of benefits such as extended operating time in the case of battery powered equipment, the use of smaller lighter batteries or the use of more economical battery technology.

The present invention may be implemented having regard to the requirements of the particular application. In applications where occasional transmission errors are tolerable it may be possible to reduce significantly the initial transmission power causing a large reduction in the power consumption, placing reliance on the fact that successful transmission is likely on repeat transmission. In applications where a saving in power consumption needs to be balanced with the avoidance of unnecessary re-transmission, the initial transmission power is not reduced to the same extent.

Although the present invention is described with reference to a mobile cellular radio telephone system, other applications include cordless telephone systems, wireless LANs, for example Hyperlan, and future generations of mobile communications such as UMTS.

Variations on the basic scheme may include increasing the retransmission power only after the first or a plurality of initial retransmission attempts have failed, thus providing greater scope for a reduction in power consumption.

Another variation on the basic scheme is to provide a progressive power increase for information that is retransmitted more than once. This further reduces the probability of unsuccessfully transmitted information being further delayed as a result of multiple retransmissions. In some cases it may be desirable to limit the maximum allowable number of retransmission attempts for a given initial transmission.

Whilst the present invention offers direct advantages in terms of reliable communication of information and a reduction in power consumption, other indirect advantages may be enjoyed through the correct implementaton of the present invention. A lower initial (hence average) transmission power can result in reduced interference with other transmissions. An example of this in a cellular system would be observed as a reduction in overall co-channel interference (and a possible reduction in other types of interference) since the duration of the high power transmissions is relatively short. This can result in less interference to other users.

Although the present invention has been described with reference to a known ARQ scheme this is not intended to indicate any limitation. As described the present invention may be primarily considered as a special ARQ scheme in which case the information is generally digital data organised into frames or packets. In this case the invention may be considered as an automatic repeat request error control scheme wherein transmitted data frames or packets which are deemed to have been unsuccessfully communicated are complemented with further transmissions at a power level greater than the power used to transmit the data frames or packets originally. The present invention is also in keeping with techniques where first and subsequent transmissions or retransmissions may be combined to recover information. In such techniques it may be preferable to employ some type of averaging, and in this case may also be preferable to give more "weight" to information transmitted at a higher power. While the present invention will be of greatest use over a wireless radio link, it may also in principle be implemented in systems employing links of other mediums, for example co-axial cable, twisted pairs and so on, although the issue of power consumption is normally of minor importance in wired communication links. Furthermore, although the present invention has been described with reference to an example employing transmission from a fixed terminal to a portable terminal, it will be apparent to the person skilled in the art that the present invention is not so limited in application. That is the present invention may be employed in the transfer of information in either direction over a communications link or in both directions, irrespective of the fact that the transmitting station and/or receiving station is fixed or mobile. It will also be apparent to the person skilled in the art that in a two way communications system a transmitting station may be combined with a receiving station.

From reading the present disclosure, other modifications will be apparent to persons skilled in the art. Such modifications may involve other features which are already known in the design, manufacture and use of systems and devices and component parts thereof and which may be used instead of or in addition to features already described herein.

I claim:

1. A method of transferring traffic information in units over a wireless digital communications link between a transmitting station and a receiving station comprising:

transmitting first information units at a first power level;

monitoring if correct reception of the transmitted units occurred; and transmitting second information units associated with the first information units, for which first information units the monitoring did not indicate correct reception occurred, at a second power level which is greater than the first power level, the second information units allowing the content of the first information units to be established;

wherein the first power level is selected to increase a probability of failed first information units transmission and of consequent second information units transmission and to minimize average power consumption taking into account the first power level and the second power level, said first power level being the lowest level to correspond to a maximum allowable probability of failed first information units transmission and said consequent second information units transmission.

2. The method of claim 1 wherein the content of the second information units is the same as the content of the first information units.

3. The method of claim 1 wherein the units are data frames or packets of data.

4. The method of claim 1 wherein monitoring is performed by the transmitting station based on information provided by the receiving station.

5. A digital wireless communications system comprising:
   at least one transmitter having means for transmitting first information units at a first power level;

at least one receiver having means for receiving the transmitted information units;

control means for controlling the transmitter output power; and monitoring means for monitoring if correct reception of the transmitted units occurred at the receiver, wherein the transmitting means transmits second information units associated with the first information units for which first information units the monitoring means does not indicate correct reception has occurred, the second information units being transmitted at a second power level that is greater than the first power level, the second power level being selected by the control means, and wherein the second information units allow the content of the first information units to be established, and wherein the control means selects the first power level to control the average power consumption of the transmitter in order to increase a probability of failed first information units transmission and of consequent second information units transmission and to minimize average power consumption taking into account the first power level and the second power level.

6. The communication system of claim 5 wherein the content of the second information units is the same as the content of the first information units.

7. The communication system of claim 5 wherein the system is a cellular mobile radio telephone system.

8. A transmitter station for digital wireless transmission of traffic information to a receiver, said transmitter station comprising:

a transmitter for transmitting first information units at a first power level;

control means for controlling the transmitter output power; and monitoring means for monitoring if correct reception of the transmitted units occurred at the receiver, wherein the transmitter transmits second information units associated with the first information units for which first information units the monitoring means does not indicate correct reception has occurred, the second information units being transmitted at a second power level that is greater than the first power level, the second power level being selected by the control means, and wherein the second information units allow the content of the first information units to be established, and wherein the control means selects the first power level to control the average power consumption of the transmitter in order to increase a probability of failed first information units transmission and of consequent second information units transmission and to minimize average power consumption taking into account the first power level and the second power level.

9. The transmitter station of claim 8 wherein the content of the second information units is the same as the content of the first information units.

10. The transmitter station of claim 8 wherein the transmitter station is employed as a component of a cellular mobile radio telephone system.

11. A method of transferring traffic information in units over a wireless digital communications link between a transmitting station and a receiving station comprising the steps of:

transmitting first information units at a first power level;

monitoring if correct reception of the transmitted units occurred; and transmitting second information units associated with the first information units, for which first information units the monitoring did not indicate correct reception occurred, at a second power level which is greater than the first power level, the second information units allowing the content of the first information units to be established;

wherein the first power level is selected to control the average power consumption of the transmitting station in order to increase a probability of failed first information units transmission and of consequent second information units transmission and to minimize average power consumption taking into account the first power level and the second power level.

12. A transmitter station comprising:

a transmitter which transmits first information at a first power level and transmits second information which includes at least portions of said first information at a second power level upon indication that said at least portions have not been correctly received by a receiver, said second power level being greater than said first power level; and a controller which selects said first power level to increase a probability of said at least portions that have not been correctly received by said receiver and of consequent transmission of said at least portions at said second power level to minimize average power consumption taking into account the first power level and the second power level.

13. A method of transferring information in units over a wireless digital communications link between a transmitting station and a receiving station, the method comprising:

transmitting first information units at a first power level;

monitoring if correct reception of the transmitted units occurred; and transmitting second information units associated the first information units, for those first information units for which monitoring did not indicate correct reception occurred, at a second power level that is greater than the first power level, the second information units allowing the content of the first information units to be established, wherein the second information units include forward error correction information associated with the first information units.

14. The method of claim 13, wherein the forward correction information is enhanced.

15. A method of transferring information in units over wireless digital communications link between a transmitting station and a receiving station, comprising:

transmitting first information units at a first power level;

monitoring if correct reception of the transmitted units occurred; and transmitting second information units associated the first information units, for those first information units for which monitoring did not indicate correct reception occurred, at a second power level that is greater than the first power level, the second information units allowing the content of the first information units to be established, transmitting further information units, associated with the first and second information units, for those second information units for which monitoring did not indicate correct reception occurred, at at least one third power level, the third information units allowing the content of the first and/or second information units to be established, with each successive power level after the second progressively increasing, wherein the first power level is selected to control average power consumption of the transmitting station in order to increase a probability of failed first information units transmission and of consequent second information units transmission and to minimize the average power consumption taking into account the first power level and the second power level.

16. The method of claim 15, wherein, after a predetermined limit of further transmissions related to the first information units, new information not related to the first information units is transmitted.

17. A method of transferring traffic information in units over a wireless digital communications link between a transmitting station and a receiving station comprising the steps of:

transmitting first traffic information units at a first power level;

monitoring if correct reception of the transmitted units occurred; and transmitting second information units associated with the first information units, for which first information units the monitoring did not indicate correct reception occurred, at a second power level which is greater than the first power level, the second information units allowing the content of the first information units to be established wherein the first traffic information is of a nature that must be received in real-time by a user; and the second information is transmitted sufficiently quickly and with sufficient increased power so that a delay perceived by the user in successful reception of the first traffic information is below a desired threshold, and wherein the first power level is selected to control average power consumption of the transmitting station in order to increase a probability of failed first information units transmission and of consequent second information units transmission and to minimize the average power consumption taking into account the first power level and the second power level.

18. The method of claim 17 wherein the content of the second information units is the same as the content of the first information units.

19. The method of claim 17, wherein the content of the second information comprises a portion of the content of the first transmission units.

20. The method of claim 17, wherein the second information comprises error correction information.

21. The method of claim 20, wherein the error correction information comprises forward error correction information.

22. The method of claim 21, wherein the enhanced error correction information comprises enhanced forward error correction information.

23. The method of claim 20, wherein the second information comprises enhanced error correction information.

24. The method of claim 17, wherein the units are data frames or packets of data.

25. The method of claim 17 wherein monitoring is performed by the transmitting station based on information provided by the receiving station.

26. The method of claim 17, wherein transmitting second information units comprises a plurality of transmissions of further information, which plurality comprises a number of transmissions that is less than or equal to a threshold number, which threshold number depends upon a battery capacity of the transmitting station.

27. The method of claim 17, wherein the transmitting of first information comprises at least one retransmission at the first power level prior to the transmission of the second information.

28. The method of claim 17, further comprising, upon reception, combining the first and second information to achieve recognition of an intended content.

* * * * *